(12) United States Patent
Brown et al.

(10) Patent No.: US 7,560,045 B2
(45) Date of Patent: Jul. 14, 2009

(54) REFRIGERANT COMPOSITION

(75) Inventors: William Brown, Pleasantville, NY (US); Myrna Serrano, Midland, MI (US); Oscar David Redwine, Coleman, MI (US)

(73) Assignee: Dow Global Technologies, Inc., Midland, MI (US)

( * ) Notice: Subject to any disclaimer, the term of this patent is extended or adjusted under 35 U.S.C. 154(b) by 187 days.

(21) Appl. No.: 11/467,371

(22) Filed: Aug. 25, 2006

(65) Prior Publication Data

US 2007/0040147 A1    Feb. 22, 2007

Related U.S. Application Data

(63) Continuation-in-part of application No. 10/969,621, filed on Oct. 20, 2004, now abandoned.

(60) Provisional application No. 60/512,975, filed on Oct. 21, 2003.

(51) Int. Cl.
C09K 5/04    (2006.01)
(52) U.S. Cl. ........................................................ 252/68
(58) Field of Classification Search .................. 252/68
See application file for complete search history.

(56) References Cited

U.S. PATENT DOCUMENTS

| | | | |
|---|---|---|---|
| 4,851,144 A | 7/1989 | McGraw et al. | |
| 4,971,712 A | 11/1990 | Gorski et al. | |
| 5,152,926 A | 10/1992 | Brown | |
| 5,543,068 A | 8/1996 | Kaimai et al. | |
| 5,560,854 A | 10/1996 | Kaimai et al. | |
| 5,946,921 A | 9/1999 | Mapes, III et al. | |
| 5,954,995 A | 9/1999 | Goble | |
| 5,984,647 A | 11/1999 | Miyamoto et al. | |
| 6,056,891 A | 5/2000 | Goble | |
| 6,117,356 A * | 9/2000 | Powell et al. | 252/67 |
| 6,258,293 B1 | 7/2001 | Lizuka et al. | |
| 6,551,523 B1 | 4/2003 | Schnur | |
| 6,582,621 B1 | 6/2003 | Sasaki et al. | |
| 6,849,583 B2 * | 2/2005 | Corr et al. | 508/405 |
| 6,853,609 B2 | 2/2005 | Kusumoto et al. | |
| 2002/0013233 A1 * | 1/2002 | Corr et al. | 508/405 |
| 2002/0055442 A1 | 5/2002 | Schnur et al. | |
| 2003/0070722 A1 * | 4/2003 | Thomas et al. | 141/1 |
| 2003/0127622 A1 | 7/2003 | Kawaguchi et al. | |

FOREIGN PATENT DOCUMENTS

EP    0 533 165    9/1992
EP    0 402 009 B2    12/1997

OTHER PUBLICATIONS

International Search Report for Application Serial No. PCT/US2004/034724 dated Mar. 18, 2005.
Article entitled "Alternative Refrigerants" AOL, Sep. 2003, by Paul Weissler.

* cited by examiner

*Primary Examiner*—John R Hardee
(74) *Attorney, Agent, or Firm*—Dobrusin & Thennisch PC

(57) ABSTRACT

This invention describes a new refrigerant/lubricant combination for use in stationary and mobile refrigeration and air conditioning applications. In these applications, the refrigerant and lubricant must be soluble in each other (e.g., miscible) to ensure adequate lubricant circulation from the compressor, through the condenser, expansion device, and evaporator, and back to the compressor. Insufficient lubricant circulation will result in compressor failure. Low temperature solubility is particularly important to ensure lubricant flow through the cold evaporator. In addition, the lubricant and refrigerant combination should be stable in the presence of steel, and aluminum and copper containing metals. This invention describes the combination of refrigerant difluoroethane (e.g. R-152a) and polar, oxygenated lubricants, particular polyalkylene glycols (PAGs) and polyolesters (POEs) which may be used as a replacement for R-134a.

20 Claims, No Drawings

REFRIGERANT COMPOSITION

CLAIM OF PRIORITY

This application is a continuation in part of U.S. patent application Ser. No. 10/969,621, filed on Oct. 20, 2004, now abandoned which in turn claims the benefit of U.S. Provisional Application 60/512,975, filed on Oct. 21, 2003, incorporated herein by reference.

FIELD OF THE INVENTION

This invention relates to an improved composition for use in devices that provide cooling or refrigeration.

BACKGROUND OF THE INVENTION

In the late 1980's to early 1990's the refrigeration and air conditioning industries switched refrigerants from R-12 (CFC-12) to R-134a (HFC-134a) due to the latter's zero ozone-depletion-potential. The mineral oil lubricants employed with R-12 were not soluble in R-134a. More polar lubricants were needed, and PAG and POE based lubricants were developed.

Because of concerns about global warming, efforts are being made to develop refrigerants that have lower global warming potential than R-134a, as well as zero ozone-depletion-potential. Indeed, R-134a cannot meet stringent newly proposed environmental standards related to global warming potential.

Much work is being done with $CO_2$ as a refrigerant, but the operating pressures of if $CO_2$ refrigeration systems are 5 to 10 times higher that those experienced with R-134a. These high operating pressures pose both safety and mechanical reliability concerns. Indeed, use of $CO_2$ requires a complete redesign of refrigeration system in order to handle the elevated pressures. Thus, $CO_2$ is not a viable 'drop-in' replacement for R-134a; that is, current refrigeration system cannot use $CO_2$ as a refrigerant. The redesign expense makes $CO_2$ an unattractive alternative to R-134a.

Difluoroethane or R-152a is another alternative refrigerant. It has a zero ozone-depletion-potential and its global warming potential is much lower than that of R-134a, which makes it attractive. However, it has not previous been pursued as a replacement for R-134a because it is mildly flammable, whereas as R-134a is essentially inert. Moreover, because of differences in physical properties, lubricants suitable for use with R-134a may not be suitable for use with R-152a. For example, lubricants have different solubilities in the two refrigerants and provide different lubricities to the refrigerants. Thus, a lubricant suitable for use with R-134a is not necessarily suitable for use with R-152a.

One known class of lubricants was described in U.S. Pat. No. 5,543,068 to Kaimai. However, the block and random copolymer and homopolymer lubricants disclosed in this patent, fail to offer sufficient solubility and/or lubricity when combined with R-134a, and thus would not likely be suitable for use in R-152a. Another class of lubricants was described in U.S. Pat. No. 6,551,523 to Schnur. However, blends of polyesters with specific quantities of neopentylglycol esters and pentaerythritol esters, are required to achieve sufficient solubility and thermal stability when combined with R-134a. Another class of lubricants includes blends of polyalkylene glycols (PAGs) and polyolesters (POEs) with hydrofluorocarbon refrigerants (e.g. U.S. Pat. No. 4,851,144).

U.S. Pat. No. 4,959,169 to McGraw discloses the use of ester end capped random and homopolymer PAGs with R-152a, however alternative capped PAGs may be desirable. U.S. Pat. No. 5,152,926 discloses the use of blends of R-134a or R-125 with other refrigerants including R-152a, where these blends of refrigerants include a lubricant with random copolymers of PAG. R-152a by itself is not disclosed with these random copolymers. The avoidance of blends of refrigerants would be desirable to ease the manufacturing costs.

These obstacles have been significant enough to prevent the use of R-152a as a replacement. The inventors have recognized solutions to one or more of these problems.

SUMMARY OF THE INVENTION

This invention describes a new refrigerant/lubricant combination for use in stationary and mobile refrigeration and air conditioning applications. In these applications, the refrigerant and lubricant must be soluble in each other (e.g. miscible) to ensure adequate lubricant circulation from the compressor, through the condenser, expansion device, and evaporator, and back to the compressor. Insufficient lubricant circulation will result in compressor failure. Low temperature solubility is particularly important to ensure lubricant flow through the cold evaporator. In addition, the lubricant and refrigerant combination should be stable in the presence of steel, and aluminum and copper containing metals. This invention describes the combination of refrigerant difluoroethane (R-152a) and polar, oxygenated lubricants, particular polyalkylene glycols (PAGs) and polyolesters (POEs) which may be used as a 'drop-in' replacement for R-134a. The invention also includes an additives package to improve the lubricity and load bearing characteristics of the combination. The preferred refrigerant is a substantially pure R-152a. Preferred lubricants include random copolymers of PAGs that are monols or ether capped, random copolymers of polyolesters, and homopolymers of PAG and homopolymers of POES.

DETAILED DESCRIPTION

The present invention includes improved compositions, methods and systems for cooling and/or refrigeration. The compositions and methods may be used in stationary or mobile systems for producing cooling. For example, the compositions and methods may be used in air conditioning systems for commercial, industrial or residential buildings. The compositions and methods may also be used in refrigerators or freezers (stationary and mobile), whether commercial, industrial or residential. The present inventions find their preferred application in vehicle air conditioning systems and other portable cooling systems.

The invention includes circulating a composition that includes at least one refrigerant and at least one lubricant through a refrigeration device. The refrigeration device may include a compressor, a condenser and an evaporator, with a liquid refrigerant line containing an expansion device such as a capillary tube, orifice or thermal expansion valve between the condenser and evaporator. In operation, the compressor compresses the refrigerant vapors, which then condense to the liquid state in the condenser and pass through the liquid line and expansion device into the evaporator. The refrigerant vaporizes in the evaporator, thereby absorbing its latent heat of evaporation from the surrounding environment, which provides the cooling.

The refrigerant may be one or more hydrofluorocarbons, such as $CH_3CHF_2$, $C_2HF_5$, $CH_2F_2$, $C_2H_3F_3$, $CHF_3$ and $C_2H_2F_4$ which are commonly known as R-152a, R-125, R-32, R-143a, R-23 and R-134a, respectively. The preferred refrigerant consists essentially of R-152a, for example as a substantially pure refrigerant of R-152a. However, R-152a may be combined with other refrigerants to modify the refrigerant's overall properties, such as maintaining the boiling point or vapor pressure within a desired range. Hydrocarbons, such as propane and butane, may be used as secondary refrigerants that are used in combination with hydrofluorocarbon refrigerants.

The lubricant may be one or more polar, oxygenated compounds including polyalkylene oxides also known as polyalkylene glycols (PAGs), and polyol esters (POEs). Preferred PAG lubricants include alkyl ether capped compounds and monols that have at least a single hydroxyl group. Diols and triols may also be suitable. Furthermore, homopolymers and random copolymers of PAGs are preferred. Preferred homopolymers are polymers of propylene oxide (PO) prepared from propylene oxide initiated with mono and polyhydric alcohols, with preferred alcohol initiators including methanol, butanol and glycerine. Preferred homopolymers have the following formula: $Z-[(-CH_2-CH(CH_3)-O-)_n-R]_p$, where Z is the residue of a compound having 1-8 active hydrogens, n is a number having an average value which will give the PAG with a number average molecular weight range from about 1000 to about 4000, R is H or an alkyl group of 1 to 6 carbon atoms, and p is an integer having a value equal to the number of active hydrogens of Z.

Preferred random copolymers comprise polymers of ethylene oxide (EO) and PO in a ratio of EO to EO+PO of between about 0.01 to about 0.75 initiated with mono and polyhydric alcohols such as methanol, butanol and glycerin. More preferred ratios include ratios incremented by about 0.05 between about 0.1 and 0.7, with most preferred ration including those incremented by about 0.1 between about 0.1 and about 0.7 (e.g. 0.1, 0.2, 0.3, 0.4, 0.5, 0.6 and 0.7). Stated alternatively, the PAGs preferably contain from about 5% to about 95% EO and correspondingly about 95% to about 5% PO. More preferably, the PAGs contain about 25% to about 75% EO and, correspondingly, about 75% to about 25% PO. The more preferred weight percents of EO and PO in the random PAG are from about 40 to about 60% EO to about 60 to about 40% PO; and the most preferred ratio is about 50:50. Suitable alkyls useful for capping the PAGs include those comprising 1 to 4 carbons to produce methyl ether capped PAGs, ethyl ether capped PAGs, propyl ether capped PAGs and/or butyl ether capped PAGs, where the PAGs are single or double end capped.

The POE lubricants are esters of fatty acids with polyhydric alcohols, e.g. diols, triols, and polyols, and/or polyhydric polyethers. Examples include dihydric alcohols, trihydric alcohols, and tetrahydric alcohols having 4 to 18 carbons such as glycerin, ethylene glycol, propylene glycol pentaerythritol, dipentaerythritol, tripentaerythritol, trimethylolpropane, trimethylolbutane, and trimethylolethane. Other suitable polyhydric alcohols include those based on sugars such as sorbitol. The fatty acids include straight and branched fatty acids having from 2-20 carbon atoms and also polyacidic (e.g. diacid) fatty acids having from 4 to 36 carbon atoms. Other examples include alkanoic acids of 4 to 18 carbon atoms. The polyol ester lubricants may be derived by esterifying, with one or more fatty acids, a polyhydric alcohol or a polyhydric polyether. Exemplary esters include ethylene glycol distearate, propylene glycol dipelargonate, glycerine trioleate, trimethylolpropane triheptonate and pentaerythritol tetraheptonate. Preferred polyesters include those based on pentaerythritol isononanoic acid. As the viscosity of the lubricant increases, it is believed that a larger fatty acid and/or an increase in the number of active hydrogens on the polyhydric alcohol will be useful to achieve the desired result. Preferred POE include those that contain substantially a single POE, where substantially a single POE means that more than about 90% (preferably more than about 95%) of the POE is derived from a single fatty acid. This becomes possible because commercial grade fatty acids are up to about 95% pure.

The lubricants preferably have a molecular weight (as measured by Gel Permeation Chromatography (GPC) or Time of Flight Mass Spectrometry (TOF-MS between about 1000 and 4000, more preferably between about 1500 and 3500. Lubricants with molecular weights in these ranges provide Falex wear testing results that are more favorable compared to lubricants with molecular weights outside of these ranges.

The lubricants are selected to have a viscosity of between about 10 and about 460 cSt at 40° C., preferably between about 22 and about 220 cSt at 40° C. and most preferably between about 40 and about 150 cSt at 40° C.

The lubricant should have sufficient solubility in the refrigerant to insure that the lubricant can return to the compressor from the evaporator. Furthermore, the refrigerant and lubricant composition should have a low temperature viscosity so that the lubricant is able to pass through the cold evaporator. In one preferred embodiment, the refrigerant and the lubricant are miscible over a broad range of temperatures.

The portions of the refrigerant and lubricant in the composition are determined so that there is sufficient lubricant to lubricate the compressor. Typically, the lubricant makes up about 1 wt % to more than about 50 wt % of the composition at the time the composition is charged into a system; and preferably between about 3 wt % and about 30 wt %, The wt % of the lubricant will typically affect the mutual solubility of the refrigerant and lubricant and thus the available operating temperatures for the refrigeration device.

In another aspect of this invention, the solubility of the lubricant in the refrigerant is temperature dependent because the temperature within the compressor is usually significantly higher than the temperature within the evaporator. Preferably, in the compressor, the lubricant and the refrigerant are separate from each other and not soluble; the lubricant is a liquid and the refrigerant is a gas being compressed. On the contrary, in the evaporator, preferably the lubricant and the refrigerant are mutually soluble. This ideal situation would lead to minimal decreases in viscosity of the lubricant in the compressor due minimal dilution by the refrigerant. This in turn leads to better lubricity and decreased lubricant discharge from the compressor. At the same time, the low temperature solubility helps insure that any lubricant that is discharged from the compressor is returned by diluting the cold lubricant and thus keeping its viscosity low. Thus, in one embodiment, a lubricant that exhibits low temperature solubility and high temperature insolubility is desirable.

In a preferred embodiment, the lubricant is soluble in the refrigerant at temperatures between about −40° C. and about 40° C. and more preferably in the range of about −40° C. and about 55° C. and most preferably in the range of about −40° C. and about 100° C.

The compositions of the present invention also include an additives package with some or all the following: an extreme pressure additive, an anti-wear additive, an antioxidant, a high-temperature stabilizer, a corrosion inhibitor, a detergent and an anti-foaming agent. Extreme pressure additives improve the lubricity and load bearing characteristics of the refrigerant composition. Preferred additives include those described in U.S. Pat. Nos. 5,152,926; 4,755,316, which are hereby incorporated by reference. In particular, the preferred extreme pressure additives include mixtures of (A) tolyltriazole or substituted derivatives thereof, (B) an amine (e.g. Jeffamine M-600) and (C) a third component which is (i) an ethoxylated phosphate ester (e.g. Antara LP-700 type), or (ii) a phosphate alcohol (e.g. ZELEC 3337 type), or (iii) a zinc dialkyldithiophosphate (e.g. Lubrizol 5139, 5604, 5178, or 5186 type), or (iv) a mercaptobenzothiazole, or (v) a 2,5-dimercapto-1,3,4-triadiazole derivative (e.g. Curvan 826) or a mixture thereof.

The additive package preferably includes a flame retardant that reduces or eliminates the likelihood of the lubricant being the fuel for a fire. Flame retardants may increase the vapor pressure of the composition, increase the flash point of composition, or otherwise reduce the chance of fire. In one embodiment, the flame retardant is a gaseous phase flame retardant (all though not necessarily the case) such that the flame is gaseous when the refrigerant is also gaseous. Suitable flame retardants include trifluorochloromethane, trifluoroiodomethane, phosphorus compounds such as phosphate esters and hydrocarbons, hydrofluorocarbons, or fluorocarbons that also contain iodine and/or bromine.

Several lubricants are investigated for suitability for use in combination with R-152a and an additives package. Unless noted otherwise, the composition contains up to about 3 wt % of the additives package as described in the last example of Table XV of U.S. Pat. No. 5,152,926 (e.g. Antara LP-700, Jeffamine M-600 and tolyltriazole). The lubricant tests are summarized in Table 1 and include several PAG and POE lubricants as well as a mineral oil lubricant for comparison. The viscosity of the lubricant is also noted at 40° C. and at 100° C.

TABLE 1

Description of Lubricants

| Lubricant (type) | Manufacturer | Lubricant Chemistry | Lube Viscosity (40° C.) | Lube Viscosity (100° C.) |
|---|---|---|---|---|
| YN-9 (mineral oil) | Idemitsu | Mineral Oil (hydrocarbon) | 100 cSt | |
| RL-488 (PAG) | Dow | Random copolymer of EO/PO 50/50 PAG monol* | 135 cSt | 125 cSt |
| RL-897 (PAG) | Dow | Homopolymer of propylene oxide PAG monol* | 62 cSt | 11.5 cSt |
| SP-10 (PAG) | Idemitsu | Random copolymer of EO/PO 10/90 PAG methyl ether double end capped | 46 cSt | 10 cSt |
| Retro 100 (POE) | Castrol | Pentaerythritol isononanoic acid POE [ | 100 cSt | |

*PAG monols have a single terminal hydroxyl group.

For each of the PAG lubricants, four compositions with R-152a are made, while two compositions each are made with the POE lubricant and the comparison mineral oil lubricant. Each of the compositions varies in the wt % of the lubricant in the composition. The compositions are then tested at various temperatures or over a range of temperatures. The compositions are visually inspected to determine if, and at what temperature, the composition separates into its component parts. Other visual characteristics are also noted as appropriate.

TABLE 2

Solubility Temperature Range of Lubricants in R-152a

| Lubricant | 3 wt % | 10 wt % | 30 wt % | 50 wt %* |
|---|---|---|---|---|
| YN-9 | | Insoluble | | Insoluble |
| RL-488 | <−40° C. to 58° C. | <−40° C. to 36° C. | <−40° C. to 39° C. | soluble at 22° C. |
| RL-897 | <−40° C. to 96° C. | <−40° C. to 89° C. | <−40° C. to 93° C. | soluble at 22° C. |
| SP-10 | <−40° C.** to 97° C. | <−40° C.** to 91° C. | <−40° C.** to 95° C. | soluble at 22° C. |
| Retro 100 | | <−40° C. to >100° C. | | soluble at 22° C. |

*The soluble temperature ranges for the 50% lubricant concentrations in R-152a were not determined.
**SP-10 dilutions were clear and colorless from room temperature (22° C.) to the high temperature cloud point. However, at −40 deg C. the samples were hazy.

From the results of the testing, it can be seen that both the PAG and the POE lubricants exhibit excellent solubility in R-152a over a wide range of temperatures and weight percentages, whereas the mineral oil is never soluble in the refrigerant, regardless of the temperature or weight percentage. Also, RL-488 exhibits an advantageous temperature dependent solubility profile i.e. low temperature solubility and high temperature insolubility.

Likewise, the solubility of three PAG lubricants is tested for R-134a using the same procedure as described above substituting R-134a for R-152a. As mentioned above, four compositions with R-134a are made for each of the three tested PAG lubricants. Each of the compositions varies in the wt % of the lubricant. The compositions are then tested over a range of temperatures. The compositions are visually inspected to determine if, and at what temperature, the composition separates into its component parts. Other visual characteristics are also noted as appropriate.

TABLE 3

Solubility Temperature Range of Lubricants in R-134a

| Lubricant | 3 wt % | 5 wt % | 10 wt % | 20 wt % |
|---|---|---|---|---|
| RL-488 | <−40° C. to 41° C. | <−40° C. to 36° C. | <−40° C. to 33° C. | <−40° C. to 31° C. |
| RL-897 | <−40° C. to 68° C. | <−40° C. to 66° C. | <−40° C. to 57° C. | <−40° C. to 61° C. |
| SP-10 | <−40° C. to 75° C. | <−40° C. to 69° C. | <−40° C. to 65° C. | <−40° C. to 68° C. |

Testing the solubility of the lubricants in both R-152a and R-134a differs in that the upper temperature limit for R-134a is lower that for R-152a. The insolubility of R-134a at higher temperatures would create a composition that is not a single phase and this may interfere with the ability of the composition to be carried along through the condenser of a refrigeration system. A single phase composition in the condenser may be desirable for some systems.

Next, the long term stability of the refrigerant and lubricant compositions is studied. Mixtures of 50 wt % lubricant and 50 wt % R-152a are sealed in high pressure glass tubes along with steel, aluminum and copper containing metals. The tubes are then heated in an oven at 175° C. for 2 weeks. The compositions are visually inspected for the number of phases and cloudiness. Further, the metals are also visually inspected. The results are shown in Table 4. As can be seen, the refrigerant and lubricant remain soluble and stable over an extended period of time in the presence of metals likely to be found refrigeration systems.

TABLE 4

Stability of Lubricants in R-152a

| Lubricant | Lubricant-R-152a Solution | Steel | Aluminum | Copper |
|---|---|---|---|---|
| YN-9 | clear, two phases | Shiny | Shiny | some tarnishing |
| RL-488 | clear, single phase | Shiny | Shiny | Shiny |
| RL-897 | clear, single phase | Shiny | Shiny | Shiny |
| SP-10 | hazy, single phase | Shiny | Shiny | Shiny |
| Retro 100 | clear, single phase | Shiny | Shiny | slightly darkened |

Next, the lubricity of R-152a/lubricant additives package compositions and R-134a/lubricant compositions were tested according to ASTM D3233 Modified Procedure A. The test procedure includes the use of a pin and V-block apparatus to incrementally increase the force of the V-block on the pin. For this test, samples of lubricant (95 ml) are saturated with either R-134a or R-152a. The lubricity, measured as load failure (lb.), is tested at about 24° C.

TABLE 5

Lubricity of R-152a and R-134a compositions

| Lubricant | Load Failure for R-134a compositions | Load Failure for R-152a compositions |
|---|---|---|
| RL-488 | 2729 lb | 2321 lb |
| RL-897 | 1252 lb | 1190 lb |
| SP-10 | 1282 lb | 1287 lb |
| Retro 100 | 2924 lb | 780 lb |

The testing shows that R-152a compositions have similar lubricities as R-134a compositions, which means that it has good affinity for metal.

As seen above, R-152a/lubricant/additives package compositions possess desirable temperature solubility profiles and the compositions are stable. However, because of its cost and mild flammability, R-152a has not previously been a suitable substitute for R-134a, Because R-134a cannot meet the stringent environmental regulations related to global warming potential, R-152a/lubricant compositions, in spite of their drawbacks, are now suitable substitutes for R-134a/lubricant compositions especially with the use of a flame retardant.

Further, R-152a/lubricant/additives package compositions are more desirable than using $CO_2$ because R-152a may be used as a 'drop-in' replacement for R-134a, whereas $CO_2$ cannot Thus, the R-152a/lubricant/additives package compositions may be used to retrofit or recondition existing systems merely by replacing the existing refrigerant with the new composition. Furthermore, the cost of monitoring or controlling the mild flammability of R-152a is small in comparison to the cost of designing, manufacturing and using high pressure $CO_2$ systems.

It will be further appreciated that functions or structures of a plurality of components or steps may be combined into a single component or step, or the functions or structures of one-step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A refrigerant composition comprising:
a. a refrigerant consisting essentially of 1,1-difluoroethane;
b. lubricant consisting of one or more propylene oxide homopolymers selected from the group consisting of polyalkylene glycols (PAG) having the formula

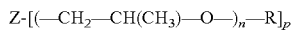

where Z is the residue of a compound having 1-8 active hydrogens,
n is a number having an average value which will give the PAG with a number average molecular weight range from about 1000 to about 4000,
R is H or an alkyl group of 1 to 6 carbon atoms, and
p is an integer having a value equal to the number of active hydrogens of Z; and
c. a flame retardant selected from the group consisting of trifluorochloromethane, trifluoroiodomethane, phosphorous compounds, phosphate esters, hydrocarbons that contain iodine or bromine, hydrofluorocarbons that contain iodine or bromine, fluorocarbons that contain iodine or bromine, or any combination thereof;
wherein the viscosity of the lubricant is between about 40 and 150 cSt at 40° C. and the lubricant is miscible in the refrigerant between about −40° C. and about 40° C.

2. The refrigerant composition of claim 1 wherein the flame retardant includes a gaseous phase flame retardant.

3. The refrigerant composition of claim 1 wherein flame retardant consists of the phosphorous compounds, the phosphate esters, or both.

4. The refrigerant composition of claim 3 wherein the lubricant consists of the propylene oxide homopolymers and the composition further comprises an additives package consisting of an extreme pressure additive, an anti-wear additive, an antioxidant, a high-temperature stabilizer, a corrosion inhibitor, a detergent, an anti-foaming agent, or any combination thereof.

5. The refrigerant composition of claim 3 wherein at least a portion of the homopolymer PAG is a polymer of propylene oxide (PO) prepared from propylene oxide initiated with a monohydric alcohol.

6. The refrigerant composition of claim 5 wherein the monohydric alcohol includes methanol.

7. The refrigerant composition of claim 5 wherein the monohydric alcohol includes butanol.

8. The refrigerant composition of claim 3, wherein at least a portion of the homopolymer PAG is a polymer of propylene oxide (PO) prepared from propylene oxide initiated with a polyhydric alcohol.

9. The refrigerant composition of claim 3, wherein the composition is a single phase at ambient temperature after 2 weeks in the presence of at least one metal catalyst at an elevated temperature up to 175° C.

10. The refrigerant composition of claim 3, wherein the composition is clear at ambient temperature after 2 weeks of storage at 175° C. in the presence of at least one metal selected from the group consisting of steel, aluminum, copper and combinations thereof.

11. The refrigerant composition of claim 10 wherein the lubricant is present at a concentration between 3 and 30 wt.%.

12. The refrigerant composition of claim 1 wherein the flame retardant consists of trifluorochloromethane, trifluoroiodomethane, phosphorous compounds, phosphate esters, hydrocarbons that contain iodine or bromine, hydrofluorocarbons that contain iodine or bromine, fluorocarbons that contain iodine or bromine, or any combination thereof.

13. The refrigerant composition of claim 12 wherein the flame retardant consists of trifluorochloromethane, trifluoroiodomethane, hydrocarbons that contain iodine or bromine, hydrofluorocarbons that contain iodine or bromine, fluorocarbons that contain iodine or bromine, or any combination thereof.

14. The refrigerant composition of claim 1 wherein
at least a portion of the homopolymers pag is a polymer of propylene oxide (PO) prepared from propylene oxide initiated with a monohydric alcohol;
the lubricant is present at a concentration between 3 and 30 wt.%; and
the composition is clear at ambient temperature after 2 weeks of storage at 175° C. in the presence of at least one metal selected from the group consisting of steel, aluminum, copper and combinations thereof.

15. The refrigerant composition of claim 14 wherein the flame retardant includes the phosphate ester.

16. The refrigerant composition of claim 15 wherein the the flame retardant consists of the phosphate ester.

17. The refrigerant composition of claim 15 wherein the monohydric alcohol includes butanol.

18. The refrigerant composition of claim 1 wherein the flame retardant consists of the phosphate esters.

19. A refrigerant composition comprising:
a. a hydrofluorocarbon refrigerant having a global warming potential lower than that of R-134a;
b. lubricant consisting of one or more propylene oxide homopolymers selected from the group consisting of polyalkylene glycols (PAG) having which has the formula

where Z is the residue of a compound having 1-8 active hydrogens,
n is a number having an average value which will give the PAG with a number average molecular weight range from about 1000 to about 4000,
R is H or an alkyl group of 1 to 6 carbon atoms, and
p is an integer having a value equal to the number of active hydrogens of Z; and
c. an additives package consisting of an extreme pressure additive, an anti-wear additive, an antioxidant, a high-temperature stabilizer, a corrosion inhibitor, a detergent, an anti-foaming agent, a flame retardant, or any combination thereof;

wherein the additives package includes the flame retardant, and the flame retardant consists of trifluorochloromethane, trifluoroiodomethane, phosphorous compounds, phosphate esters, hydrocarbons that contain iodine or bromine, hydrofluorocarbons that contain iodine or bromine, fluorocarbons that contain iodine or bromine, or any combination thereof.

20. The refrigerant composition of claim 19 wherein the flame retardant consists of the phosphate esters.

* * * * *